United States Patent
Heinson et al.

(10) Patent No.: US 9,219,705 B2
(45) Date of Patent: Dec. 22, 2015

(54) SCALING NETWORK SERVICES USING DNS

(75) Inventors: Bill Heinson, Bothell, WA (US); Jason A. Antonelli, Redmond, WA (US); Thomas Jeyaseelan, Kirkland, WA (US); Jacob Kim, Issaquah, WA (US); Amy McDonald, Redmond, WA (US); Greg Phipps, Gilroy, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 384 days.

(21) Appl. No.: 11/768,083

(22) Filed: Jun. 25, 2007

(65) Prior Publication Data

US 2008/0320003 A1    Dec. 25, 2008

(51) Int. Cl.
*H04L 29/12* (2006.01)
*H04L 29/08* (2006.01)

(52) U.S. Cl.
CPC ...... *H04L 61/1511* (2013.01); *H04L 29/12066* (2013.01); *H04L 29/12132* (2013.01); *H04L 61/1552* (2013.01); *H04L 67/1002* (2013.01); *H04L 67/1023* (2013.01); *H04L 67/1036* (2013.01)

(58) Field of Classification Search
CPC .................. H04L 29/12066; H04L 29/12132; H04L 61/1511; H04L 61/1552
USPC ......... 709/217, 218, 223, 245, 224, 225, 250; 707/100, 694, 695, 726, 800
See application file for complete search history.

(56) References Cited

U.S. PATENT DOCUMENTS

| | | | |
|---|---|---|---|
| 5,983,270 A * | 11/1999 | Abraham et al. ............ | 709/224 |
| 6,263,506 B1 * | 7/2001 | Ezaki et al. ................. | 725/116 |
| 6,442,602 B1 * | 8/2002 | Choudhry ..................... | 709/218 |
| 6,510,457 B1 * | 1/2003 | Ayukawa et al. ............. | 709/217 |
| 6,643,707 B1 * | 11/2003 | Booth .......................... | 709/245 |
| 6,687,746 B1 * | 2/2004 | Shuster et al. ............... | 709/223 |
| 6,966,058 B2 | 11/2005 | Earl et al. | |
| 7,178,056 B2 | 2/2007 | Shanbhogue | |
| 7,194,552 B1 * | 3/2007 | Schneider .................... | 709/245 |
| 7,225,254 B1 * | 5/2007 | Swildens et al. ............. | 709/224 |
| 7,321,926 B1 * | 1/2008 | Zhang et al. ................. | 709/220 |
| 7,386,552 B2 * | 6/2008 | Kitamura et al. ............ | 1/1 |
| 7,506,044 B2 * | 3/2009 | Doshi et al. ................. | 709/223 |
| 7,567,504 B2 | 7/2009 | Darling et al. | |
| 2002/0178254 A1 | 11/2002 | Brittenham et al. | |

(Continued)

OTHER PUBLICATIONS

Sah, Adam, "A New Architecture for Managing Enterprise Log Data", Proceedings of LISA '02: Sixteenth Systems Administration Conference, Nov. 3-8, 2002, pp. 121-132.

(Continued)

*Primary Examiner* — Md. I Uddin

(74) *Attorney, Agent, or Firm* — Bryan Webster; Kate Drakos; Micky Minhas

(57) ABSTRACT

Lookup requests received by a domain name service (DNS) are processed based on the actual location of data associated with a requested content page rather than a domain mapping of IP addresses. A DNS server which receives a request initiates a query for the location of user data associated with the request based on an object handle contained in a domain name of the request. The location data is used to construct an IP address which is provided in response to the IP lookup request received by the DNS server. The DNS system may be used to provide IP addresses for a scaled web-based networking service, alternate versions of a service and a service implementing rolling upgrades.

9 Claims, 16 Drawing Sheets

(56) References Cited

U.S. PATENT DOCUMENTS

| | | |
|---|---|---|
| 2003/0065763 A1* | 4/2003 | Swildens et al. ............ 709/224 |
| 2005/0108071 A1 | 5/2005 | Jain et al. |
| 2005/0154768 A1 | 7/2005 | Theimer et al. |
| 2005/0210461 A1 | 9/2005 | Srivastava et al. |
| 2006/0009996 A1 | 1/2006 | Lipscomb et al. |
| 2006/0130042 A1 | 6/2006 | Dias et al. |
| 2006/0233106 A1 | 10/2006 | Achlioptas et al. |
| 2007/0011685 A1 | 1/2007 | Yim et al. |
| 2007/0294754 A1 | 12/2007 | Finkelstein et al. |
| 2008/0209273 A1 | 8/2008 | Bahl et al. |
| 2009/0086640 A1 | 4/2009 | Zhang et al. |
| 2009/0086741 A1 | 4/2009 | Zhang et al. |
| 2009/0089438 A1 | 4/2009 | Agarwal et al. |

OTHER PUBLICATIONS

Bobba, et al., "Load Sharing Under WindowsNT", http://citeseer.ist.psu.edu/cache/papers/cs/26813/http: zSzzSzbahia.cs.panam.eduzSzTRzSzbobbams.pdf/load-sharing-under-windowsnt.pdf.

Microsoft Corporation, "Rolling Upgrades", Mar. 28, 2003, http://technet2.microsoft.com/windowsserver/en/library/8bc3cb2c-832f-4a54-b2e4-31fff977ef911033.mspx?mfr=true.

Goyal, et al., "Server Grid", Chapter 5, pp. 127-168, Enterprise Grid Computing with Oracle, The McGraw-Hill Companies, Inc., 2006.

Bea Systems, "WebLogic Server Rolling Upgrade—What is Rolling Upgrade?", http://e-docs.bea.com/common/docs92/upgrade/rolling_upgrade.html.

Microsoft Corporation, "Windows 2000 Clustering: Performing a Rolling Upgrade", http://www.microsoft.com/technet/prodtechnol/windows2000serv/deploy/rollout/rollupgr.mspx.

* cited by examiner

IP lookup table

| Data center | Server Cluster | Version | IP Address |
|---|---|---|---|
| 001 | 001 | 004 | 062.129.006.003 |
| 001 | 002 | 005 | 062.129.015.004 |
| 002 | 004 | 004 | 132.307.030.021 |

Object Handle Table

| Object handle | Data Center | Server Cluster | Version |
|---|---|---|---|
| jasona | 001 | 001 | 004 |
| Jkim | 002 | 001 | 004 |
| billh | 001 | 001 | 005 |
| srb | 002 | 001 | 004 |

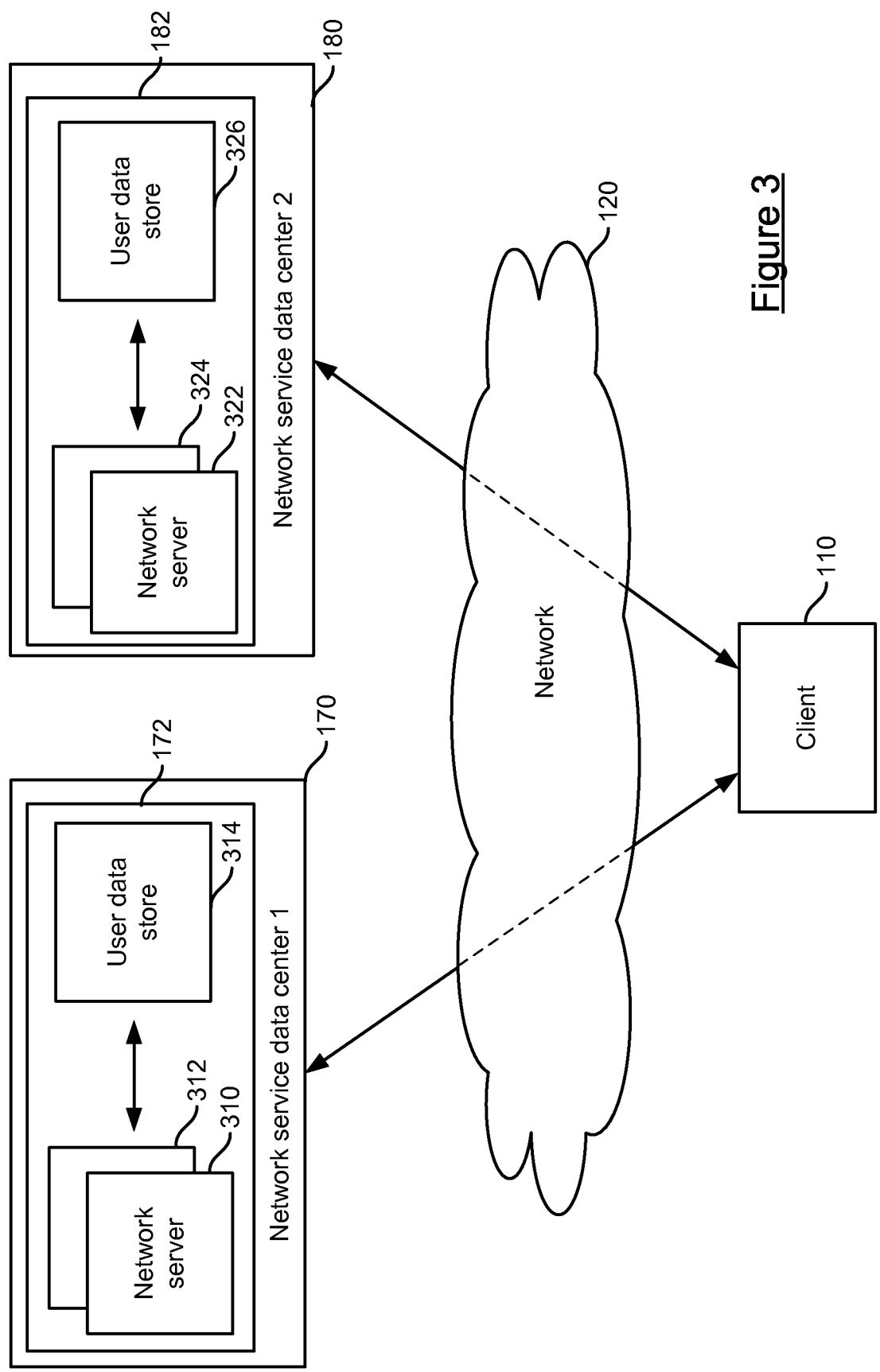

SCALING NETWORK SERVICES USING DNS

BACKGROUND

The growing presence of the Internet as well as other computer networks such as intranets and extranets has brought many new applications in e-commerce and other areas, including web-based networking services. Web-based networking services allow a user to develop a personal content page which can be viewed over the web. The networking service content page may allow a user to provide their personalized content at a set IP address for others to view and interact with.

As a web-based networking service adds more and more accounts, the data corresponding to one or more user content pages may have to be moved from one server to another. This can cause problems for services that provide a customized domain name for each content page based on a user alias. In particular, changing a content page domain name may affect links to the page, page ratings, and other information associated with a previous domain name for a content page.

SUMMARY

The present technology enables lookup requests received by a domain name service (DNS) to be processed based on the actual location of data associated with a requested content page. When a DNS server receives a lookup request for a domain name within a particular domain, the DNS server initiates a query for the location of user data associated with the request. The location data may be in the form of a data center and/or a server cluster within a data center and may be linked to a user identifier. In some embodiments, the identifier may be an object handle contained in a URL associated with the user's content page. For example, the object handle may be a user alias that is contained in the domain name received by the DNS system. The location data is used to construct an IP address which is provided in response to the IP lookup request received by the DNS server.

The DNS system may be used to scale a web-based networking service. The networking service may be scaled over several data centers without changing a URL associated with a user's content page provided by the service. The location of user content page data (from which an IP address is provided to a client) is linked to an object handle for the user. As the location of the user data changes, location data linked to the object handle is updated to provide an IP address which reflects the location of the user content data.

The DNS system may also be used to implement an alternate version of a service and perform rolling upgrades. To implement a beta service, version data may be linked to a user object handle in addition to user location data. As a result, the IP address for a user's content page may be constructed from the user location and version data. Rolling upgrades may be performed to one or more servers having content page data using the DNS system. A roaming server cluster may be used to temporarily serve user data and process user requests while a user cluster is being updated. During this temporary data service transfer from a user cluster to a roaming user cluster, the IP address constructed in response to DNS lookup requests may direct a requesting user to the user's content page contained on the roaming server cluster.

An embodiment includes a method for providing an IP address which begins with receiving a DNS lookup request from a client. The DNS lookup request includes a domain name within the request. An object handle is identified within the domain name. The object handle is associated with a user, group or other owner of a content page provided by a web-based networking service. Location data linked to the object handle and identifying the location of data associated with the user's account for the web-based networking service is then retrieved. An IP address is then determined based on the location data and sent to the client in response to the DNS lookup request.

Another embodiment receives a DNS lookup request with a domain name and determines an object handle from the domain name. The object handle is associated with a user of a web-based networking service. Location and version data linked to object handle is then retrieved. The version data is associated with a version of a web-based networking service used by the user. An IP address associated with a server cluster is then determined based on the retrieved location and version data and sent to a remote computer in response to the DNS lookup request.

Another embodiment receives a DNS lookup request and identifies an object handle within a domain name included in the request. Location data linked to object handle is retrieved and a load balance requirement is determined for one or more network servers associated with the location data. An IP address is then determined for one of the one or more network servers based on the location data and load balancing requirement then sent to a client in response to the DNS lookup request This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 2C is an example of an object handle table.

FIG. 3 is a block diagram of an embodiment of a system including data centers which provide a scaled network service.

DETAILED DESCRIPTION

Figure 1:
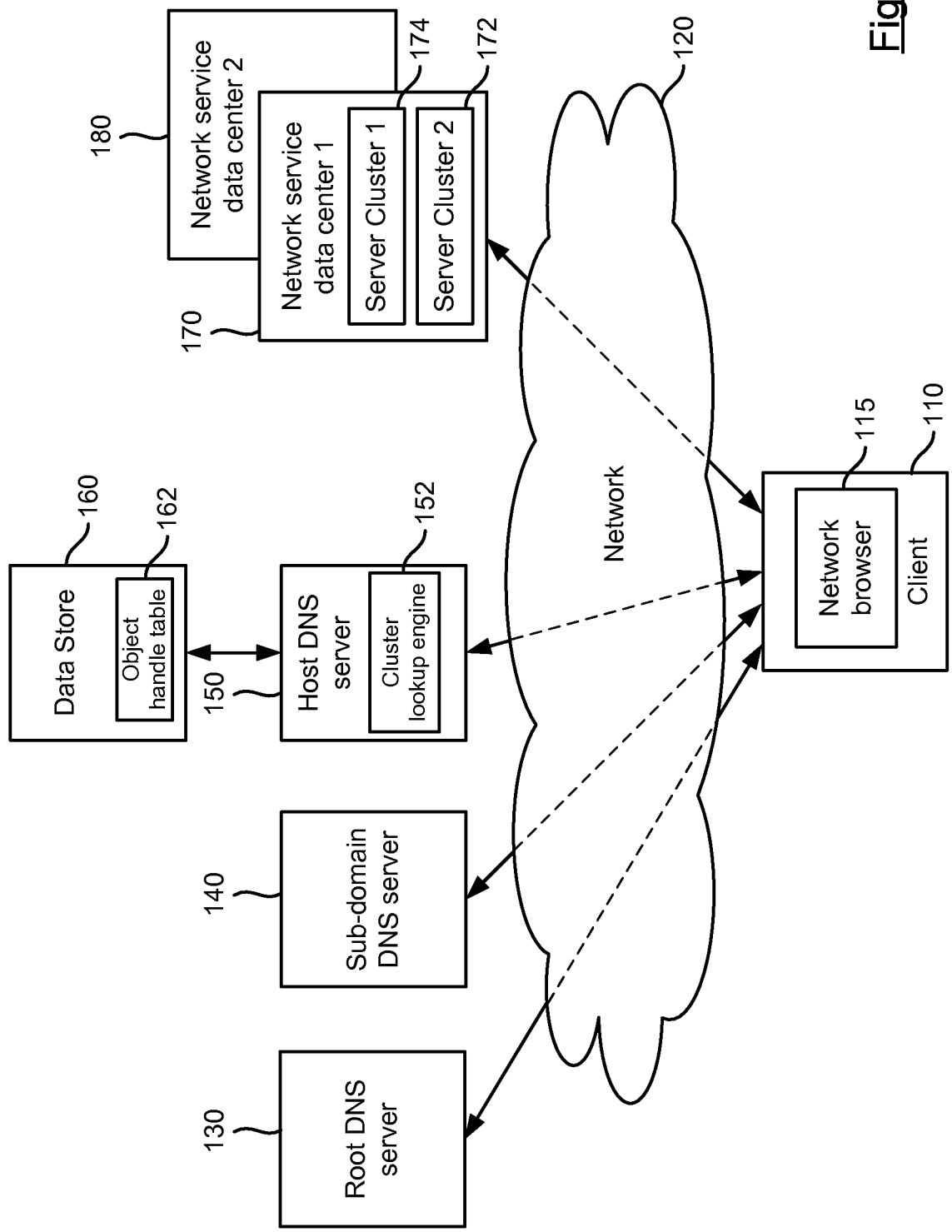
FIG. 1 is a block diagram of a system for handling DNS lookup requests.

A domain name service (DNS) processes IP address lookup requests based on location data linked to the network page requested. When a DNS server receives a lookup request for a domain name within a particular domain, the DNS server initiates a query for the location of user data associated with the request. In some embodiments, the query is only for the domain of a user page. The location data may be in the form of a data center and/or a server cluster within a data center and is linked to a user identifier. In some embodiments, the identifier may be an object handle contained in a URL associated with the user's content page. For example, the object handle may be a user alias that is contained in the domain name received by the DNS system. The location data is used to construct an IP address which is provided in response to the IP lookup request received by the DNS server.

In some embodiments, the present technology is used to process IP lookup requests. In particular, an IP addresses for a networking service content pages is derived from the location of the user data associated with the page rather than the format of the domain name. The content page may be provided by a web-based networking service, such as "Windows Live Spaces," by Microsoft Corporation of Redmond, Wash.

The location of user data associated with a content page can be determined based on an object handle associated with the user. The object handle may be a user alias, number or some other unique identifier for the user and may be accessed based on a domain name. In some embodiments, the object handle may be extracted directly from the domain name. For example, for a domain name:

billh.spaces.live.com, the object handle may be the host portion of the domain name, or "billh." The object handle may be extracted and used to retrieve location data for a content page associated with the alias "billh." An IP address is then constructed from the location data and provided in response to an IP lookup request by the DNS system. By providing an IP address based on user content location rather than the structure of the domain name, the DNS system may scale a networking service without changing the URL for content pages, change the location of content page user data as well as service versions provided for a user without changing static records within a DNS server itself.

Several examples are discussed herein with respect to the object handle of a user. These examples are not intended to exclude embodiments wherein an object handle represents a group or some other entity associated with a content page provided by a network service.

The DNS system may be used to scale a web-based networking service. The networking service may be scaled over several data centers without changing a URL associated with a user's content page provided by the service. The location of user content page data, and consequently, the IP Address of the web site serving the user content, is linked to an object handle for the user. Because the object handle is included in the domain name in some form, the IP address of the web site can be directly derived from the domain name. By always associating a user's web content site with closest proximity to the location of its data, it is possible to configure the DNS routing system to always return an optimal IP address for every DNS query for a user. If the user's data is moved from a first server cluster to a second server cluster within the same or a different data center, the location data linked to the user's object handle may be changed as well.

The DNS system may also be used to implement a beta service. In some embodiments, version data may be linked to a user object handle in addition to user location data. As a result, the IP address for a user's content page may be constructed from the user location and version data. The IP address may be selected based on whether or not the user content page is provided using a beta version or some other version of a networking service.

Rolling upgrades may be performed to one or more servers having content page data using the DNS system. In some embodiments, servers used to access or serve data for one or more user content pages may be moved from one server cluster to another to update a server cluster. In this case, a roaming server cluster may be used to temporarily serve user data while a user cluster is being updated. During this temporary data service transfer from a user cluster to a roaming user cluster, an IP address constructed in response to DNS lookup requests for the moved user data may direct a user to the roaming server cluster. In some embodiments, load balancing techniques may be used to direct IP lookup requests to two or more servers during the upgrade.

FIG. 1 is a block diagram of a system for handling DNS lookup requests. The system of FIG. 1 includes client 110, root DNS server 130, sub-domain DNS server 140, host DNS server 150, data store 160, network service data centers 170 and 180 and network 120.

Network 120 may be implemented as the Internet or other WAN, a LAN, intranet, extranet, private network or other network or networks.

Client 110 may include network browser 115. Network browser 115 may communicate with servers 130-150 and access content from data centers 170 and 180 over network 120. To access content over network 120, network browser 115 may transmit a DNS lookup request to one or more DNS servers in response to receiving a domain name from a user. The DNS lookup request may be sent to root DNS server 130, sub-domain DNS server 140 or host DNS server 150. In some embodiments, applications other than a network browser may be used, such win32, Macintosh, or Linux based or other applications.

Root DNS server 130 may communicate with client 110 over network 120 and provide DNS lookup information for a root element of a domain name. In some embodiments, root DNS server 130 provides information in response to a root of ".com." In some embodiments, upon receiving a request for a domain name that ends with ".com," root DNS server 130 may provide name source (NS) records which include locations of other DNS servers to be queried based on other parts of the domain name in the request.

Sub-domain DNS server 140 may communicate with client 110 over network 120 and provide DNS lookup information for a sub-domain portion of a domain name. Sub-domain DNS server 140 will typically be accessed by client 110 from information provided to client 110 by root DNS server 130. For example, sub-domain DNS server 140 may provide information for a "live.com" sub-domain of a domain name. Upon receiving a request for a domain name that ends with "live.com," sub-domain DNS server 130 may provide name source (NS) records which include locations of other DNS servers to be queried based on other parts of the domain name in the request.

Host DNS server 152 provides IP addresses for domains specified in an IP lookup request and communicates with data store 160 and client 110. Cluster lookup engine 152 may be implemented within or at least in part within host DNS server 152. In some embodiments, the host DNS server may have IP addresses for domain names ending in "spaces.live.com."

Cluster lookup engine 152 may retrieve location data associated with an object handle for a user. In some embodiments, cluster lookup engine 152 may determine a user object handle based on a domain within an IP lookup request, retrieve location data from data store 160 for the object handle, construct an IP address based on the retrieved location data, and send a response to client 110. Cluster lookup engine 152 is described in more detail below with respect to FIG. 2A.

Data store 160 communicates with host DNS server 152 and includes object handle table 162. Object handle table 162 may include data center, server cluster and version data linked to an object handle. In some embodiments, data store 160 may be implemented as a light weight server able to quickly process requests based on an object handle parameter. Data store 160 may be implemented as an SQL server, .Net server or some other type of server. Object handle table 162 is described in more detail below with respect to FIG. 2C. In some embodiments, data store 160 may implement a SOAP interface and API for receiving requests to access content within object handle table 162.

Network service data centers 170 and 180 may each include one or more server clusters and communicate with client 110 over network 120. In some embodiments, a network service data center may be associated with a geographic location or region. For example, a network service data center may be associated with a region such as Europe, Asia, North America or some other region. Each data center may include one or more server clusters, each containing all the content page data for one or more users. Thus, content page data is not distributed over two or more server clusters for any users.

Server clusters 172 and 174 may each include one or more network servers and a data store (not illustrated). Each server cluster may provide content pages and contain all related content page data for a user of a networking service. In some embodiments, different server clusters may provide different versions of the networking service, such as a beta version, upgraded version, main version, and so on. Location data which describes a data center and server cluster may be stored in object handle table 162 and linked to an object handle for a user whose content page is provided by the server cluster.

In some embodiments, client 110, servers 130-150, data store 160, one or more servers of server clusters 172-174, and other machines within network service data centers 170 and 180 may be implemented by the computing environment of FIG. 14, discussed in more detail below.

Figures 2A, 2B:
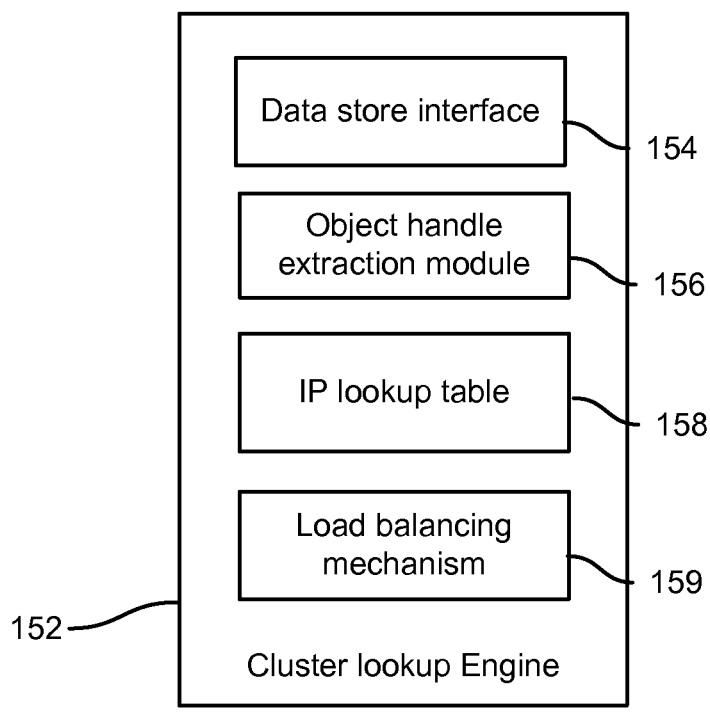
FIG. 2A is a block diagram of a cluster lookup engine.
FIG. 2B is an example of an IP lookup table.

FIG. 2A is a block diagram of a cluster lookup engine. Cluster lookup engine 152 of FIG. 2A includes data store interface 154, object handle extraction module 156, static IP lookup table 158 and load balancing mechanism 159. Data store interface 154 may be used to send requests and process responses received from data store 160, such as a request for location data based on an object handle. In some embodiments, data store interface 154 may send requests in SOAP format.

Object handle extraction module 156 may be used to extract object handle data from a URL. In some embodiments, a lookup request received from network browser 115 of client 110 by DNS server 152 may include a domain name expressed as a URL. Object handle extraction module 156 may extract the object handle as the host portion of the URL received from network browser 115. For example, a URL may be expressed as "abc.spaces.live.com." In this case, the object handle would be the first portion of the URL, or "abc."

IP lookup table 158 may contain IP addresses for network servers of server clusters within different data centers. This information is used to determine an IP address for data center and server cluster location data provided by data store 160 to cluster lookup engine 152. For example, in response to receiving location data for a particular data center (and optionally a server cluster), cluster lookup engine 152 may determine an IP address of a network server within the data center (and server cluster, if provided) using IP lookup table 158. In some embodiments, the IP lookup table 158 may be stored elsewhere in host DNS server 150 or outside host DNS server 150, but accessible by cluster lookup engine 152. An example of IP lookup table 158 is provided in FIG. 2B.

Load balancing mechanism 159 is used to balance loads for one or more data centers or server clusters. For example, when a server cluster is being upgraded, a roaming server cluster may handle the requests normally handled by the server cluster being upgraded. User requests to the roaming server cluster may be load balanced to ensure the network servers within the roaming server cluster can handle the load based on their capacity. Load balancing mechanism 159 may include a hash table of the data centers and server clusters for which load balancing should be provided, load balancing requirements for the data centers and server clusters, one or more counters or other mechanisms for tracking the history of requests sent to network servers within a data center in order to maintain load balancing requirements, and other data.

FIG. 2B is an example of IP lookup table 158. Table 158 of FIG. 2B includes columns of data center, server cluster, version and IP address. As illustrated, the table provides an IP address for different combinations of data center and server cluster information, and optionally for a version of the networking service in use by a user. For example, the first listed IP address of 062.129.006.003 corresponds to data center 001 and server cluster 001 and implements a version 004 of the networking service. The IP address 062.129.015.004 corresponds to data center 001 and server cluster 002 and implements a version 005 of the networking service.

FIG. 2C is an example of object handle table 162. Object handle table 162 is stored within data store 162 and includes columns of object handle, data center, service cluster and version. The data center, server cluster and version information are all linked to a particular object handle. For example, the first row of user data indicates that the object handle of "jasona" is associated with data center 001, server cluster 001 and a version 004. The second row of user data indicates that a user having an object handle of "Jkim" has user data stored at server cluster 001 within data center 002 and uses a version 004, the same version as the user associated with object handle "jasona." The third user data row lists a user object handle of "billh" with data stored at server cluster 001 within data center 001 and a version of 005. This particular user is using a different version than the previous two listed users. Determining IP addresses for a particular set of data center and service cluster information as well as different service versions is discussed in more detail below.

Figure 4:
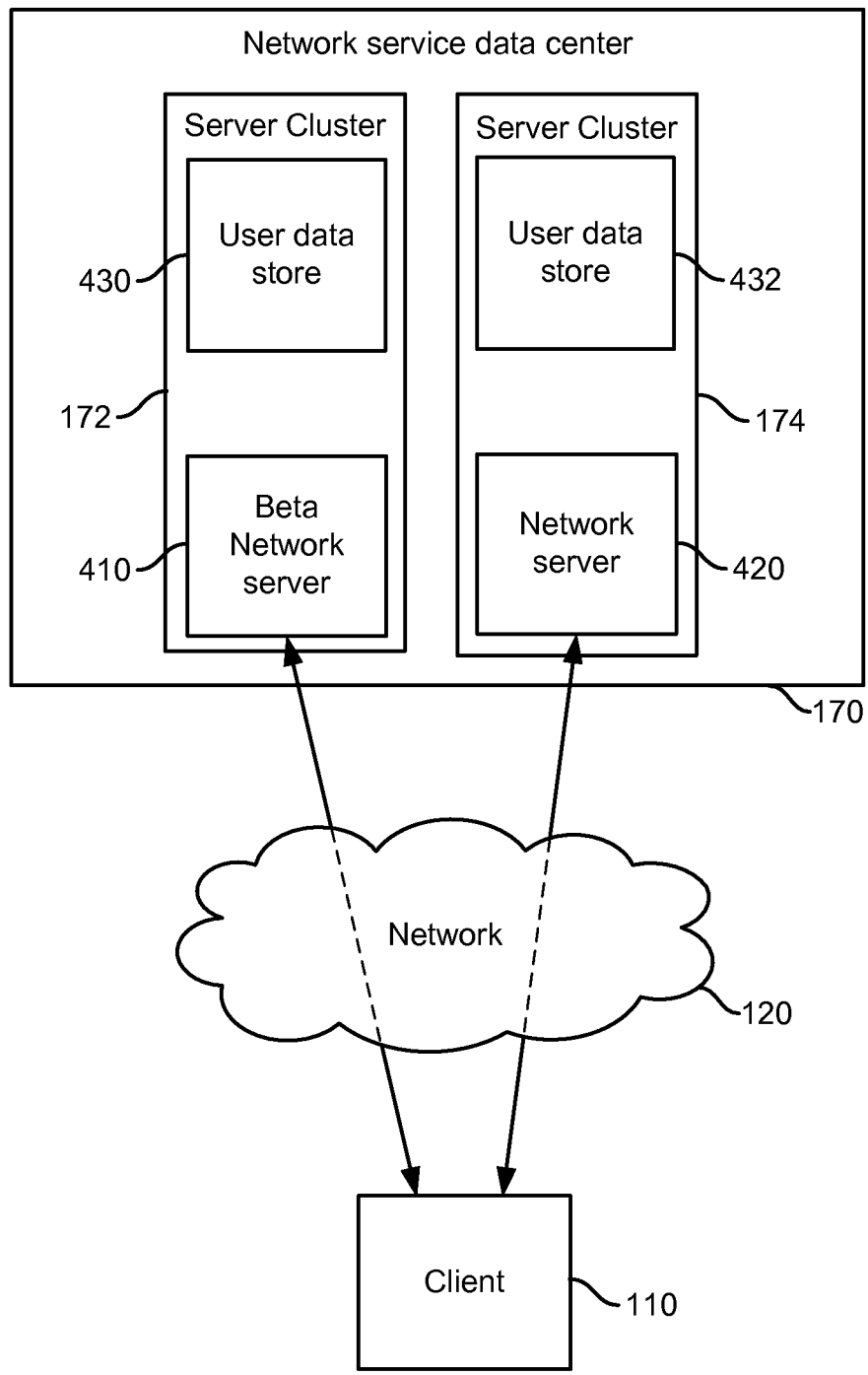
FIG. 4 is a block diagram of an embodiment of a data center which provides different versions of a network service.
Figure 5A:
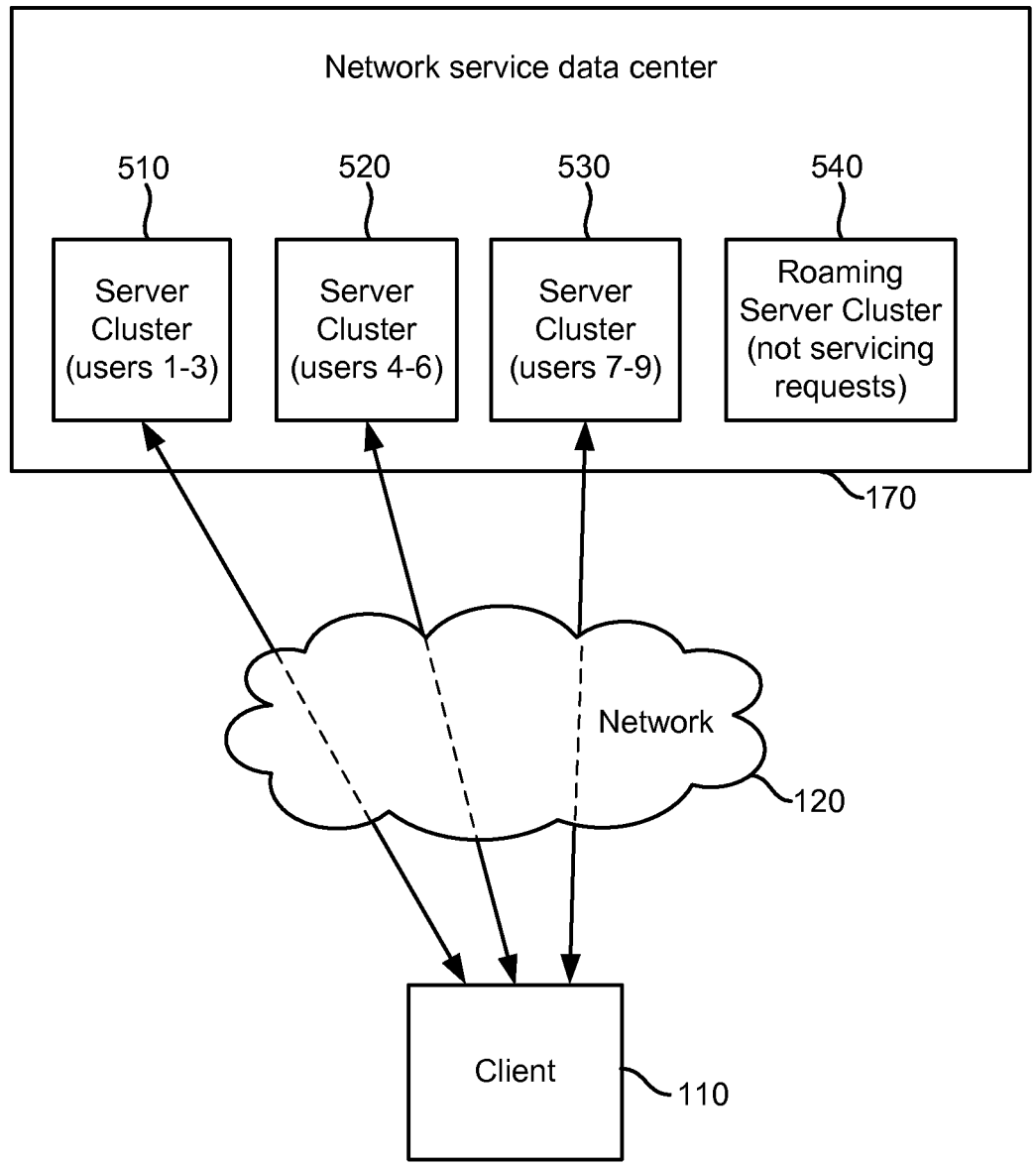
FIG. 5A is a block diagram of an embodiment of a data center which provides rolling server cluster upgrades.
Figure 5B:
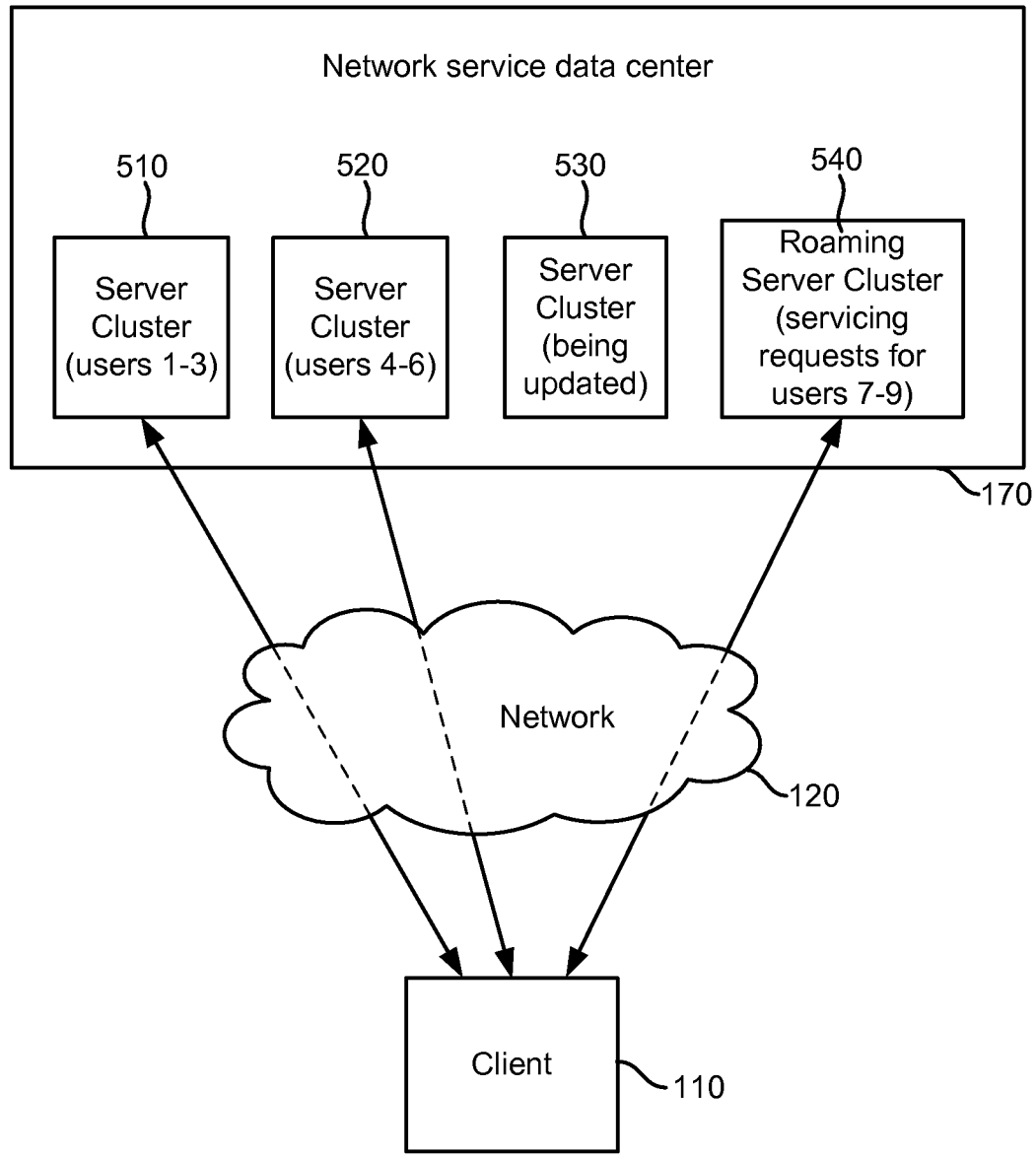
FIG. 5B is a block diagram of another embodiment of a data center which provides rolling server cluster upgrades.

FIGS. 3 through 5B illustrate client 110 and one or more of network service data centers 170 and 180 of FIG. 1 as implemented in different embodiments of the present technology. In particular, FIG. 3 provides more information for a network service which is scaled over two or more network service data centers, FIG. 4 provides more information for a data center with server clusters that provide multiple versions of a network service, and FIGS. 5A-5B provide more information for a data center which provides rolling server cluster upgrades.

FIG. 3 is a block diagram of an embodiment of a system including data centers which provide a scaled network service. FIG. 3 includes network service data centers 170 and 180, network 120 and client 110. Network service data center 170 includes server cluster 172, which includes network servers 310 and 312 and user data store 313. Network service data center 180 of FIG. 3 includes server cluster 182, which includes network servers 322 and 324 and user data store 326. As illustrated, a networking service for providing content pages is scaled into two different data centers 170 and 180. All data associated with a particular user's content page is provided within one server cluster. For example, when an IP lookup request is received for a URL associated with a user's content page stored in user data store 314, cluster lookup engine 152 will provide an IP address associated with either network server 310 or network server 312 of server cluster 172 (which contains user data store 314). Thus, though the data for different user content pages may be scaled over data centers 170 and 180 in different regions, the DNS system of the present technology may use the same domain name format and still provide IP addresses to several different network servers, such as servers 310, 312, 322 and 324. Providing a scaled networking service using DNS is discussed in more detail below with respect to FIG. 8.

FIG. 4 is a block diagram of an embodiment of data center 170 which provides different versions of a networking service. Data center 170 of FIG. 4 includes server clusters 172 and 174. Server cluster 172 includes beta network server 410 and user data store 430 and server cluster 174 includes network server 420 and data store 432. Beta network server 410 may provide a beta or trial version of a networking service. A main version of the networking service may be provided through network server 420. Both networking service versions provided may access user data from their respective user data stores. Thus, when a user selects to use a beta version of a networking service, the user content page data is transferred from user data store 432 to user data store 430 associated with beta network server 410. The version number of the beta networking service used and optionally the IP address of network server 410 are then provided to object handle table 162 for the object handle of the user who selected the beta service. In subsequent requests for domain names associated with the user's content page, the IP address associated with beta network server 410 (or some other server within server cluster 172 that provides the beta version of the service) will be provided in response to the request. Similarly, when a user chooses to return to a main version of the service from a beta service, the user's data is moved to a serve cluster associated with the main service and the object handle table is updated with the changed location data for the object handle associated with the user. Providing beta clustering using DNS is discussed in more detail below with respect to FIG. 9.

FIG. 5A provides a block diagram of an embodiment of a data center 170 which provides rolling server cluster upgrades. Network service data center 170 of FIG. 5A includes server clusters 510-530 and roaming server cluster 540. Server cluster 510 may include data for the content pages of users 1-3, server cluster 520 may include data for the content pages of users 4-6 and server cluster 530 may provide content page data for users 7-9. In the embodiment of FIG. 5A, roaming server cluster 540 is not currently servicing requests. Rather, the roaming server cluster may be used to temporarily provide "rolling" upgrades for server clusters 510-530, one server at a time.

When upgrading a server cluster, the user data on an 'active' server cluster is moved to roaming server cluster 540. The roaming server cluster is then made active and the empty but active server cluster is inactivated and upgraded. During the upgrade, the location data for the user data moved to roaming server cluster 540 is updated in object handle table 162 to reflect the new location. In some embodiments, hash values are used to identify object handles for which content page data has been moved to a roaming server cluster. The hash values may be stored in cluster lookup engine 152. In some embodiments, load balancing can be applied to the requests sent to roaming server cluster 540 during the upgrade of another server cluster. Load balancing is discussed in more detail below.

In some embodiments, rolling upgrades may be performed when an existing cluster is taken out of rotation to be upgraded and the cluster's load is distributed to other clusters while the specific cluster is getting upgraded. In this embodiment, cluster lookup engine 152 is aware of additional cluster(s) available to service the request while current server cluster is being upgraded.

FIG. 5B is a block diagram of another embodiment of data center 170 which provides for rolling server cluster upgrades. The system of FIG. 5B is similar to that of FIG. 5A, except for the content page data for users 7-9 has been transferred from server cluster 530 to roaming server cluster 540. In FIG. 5B, server cluster 530 is inactive and being upgraded while the roaming server cluster 540 is active and providing content pages for users 7-9 in response to content page requests from client 110. While roaming server cluster 540 contains content page data for users 7-9, cluster lookup engine 152 constructs an IP address for with roaming server cluster 540 upon receiving a DNS lookup request for domain names associated with content pages for one of users 7-9.

After server cluster 530 is updated, the data for users 7-9 will be returned to server cluster 530 and roaming serving cluster 540 will again be inactive. Then, roaming server cluster 540 will receive the user data for users 4-6 from server cluster 520. After transferring the data from server cluster 520 to roaming server cluster 540, server cluster 520 will then be updated similarly as server cluster 530 was. This process is repeated for server cluster 510 for users 1-3 and any other server clusters within network service data center 170. As content page data is moved from one server to another, the corresponding location data for the object handle for each user is updated in object handle table 162 (and optionally as hash values for the users in cluster lookup engine 152). Providing rolling upgrades using DNS is discussed in more detail below with respect to FIGS. 10-11.

Figure 6:
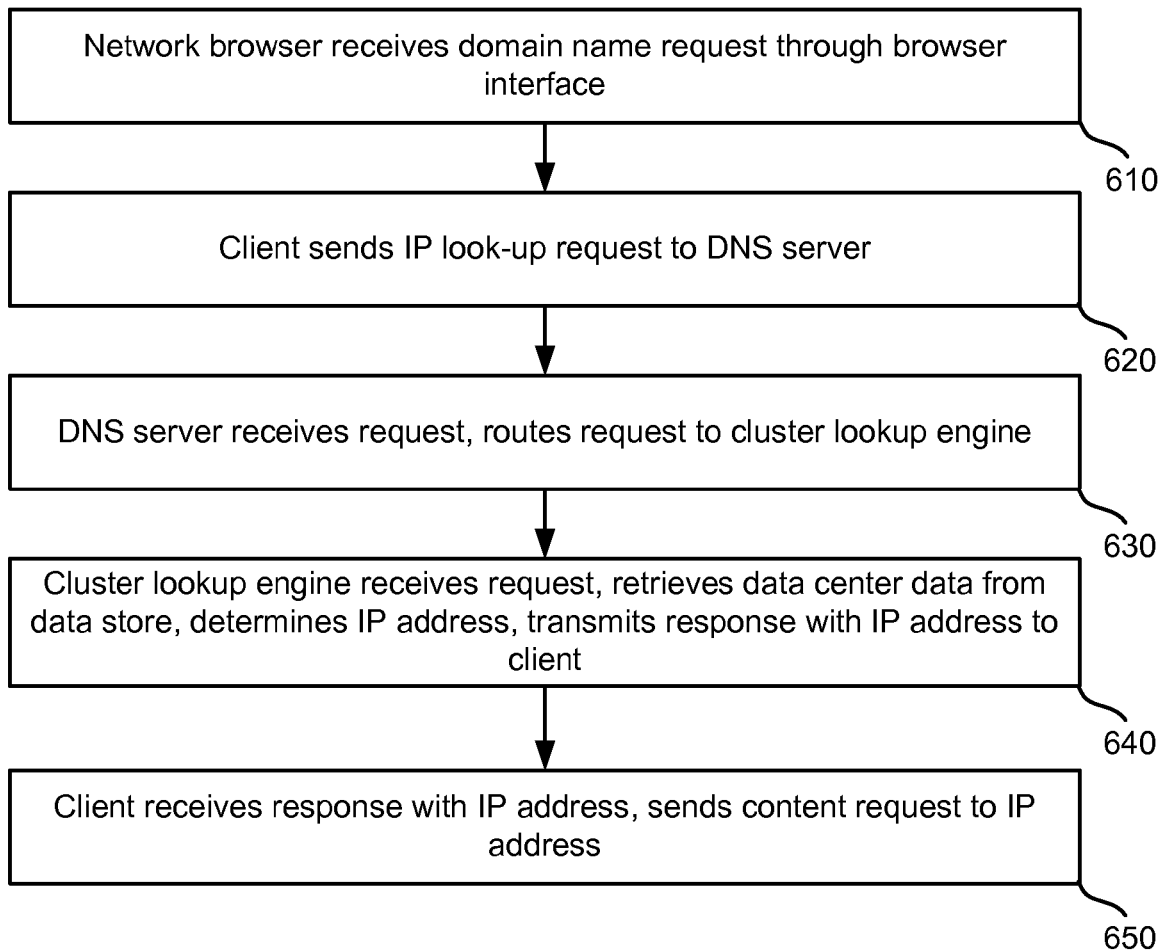
FIG. 6 is a flow chart of an embodiment of a method for retrieving an IP address from a DNS server.

FIG. 6 is a flow chart of an embodiment of a method for retrieving an IP address from a DNS server. First, network browser 115 receives a domain name request through a browser interface at step 610. The request may be received as a selection of a favorite domain name, typing of a domain name in a URL window, selection of a link by a user, an automatic request made by code within the network browser or some other request.

After receiving the request, client 110 sends an IP lookup request to a DNS server at step 620. Initially, the DNS server request may be sent to root DNS server 130. Eventually, client 110 will be redirected to host DNS server 150. Sending an IP lookup request to a DNS server from client 110 is discussed in more detail below with respect to FIG. 7.

Host DNS server 150 receives a request from client 110 and routes the request to cluster lookup engine 152 at step 630. Next, cluster lookup engine 152 receives the request and processes the request at step 640. Processing the request may include retrieving server data from data store 160, determining an IP address from the retrieved data and transmitting a response with the IP address to client 115. Retrieving server data may include retrieving server cluster location data from data store 160 associated with an object handle retrieved from a URL in the DNS lookup request. The IP address sent to the client may be contained in an A record generated by cluster lookup engine 152. Retrieving server data, determining the IP address and transmitting a response with the IP address may be handled in different ways depending on different embodiments of the present technology. Generating and transmitting a response for a basic scaled networking service is discussed in more detail below with respect to FIG. 8. Determining and transmitting a response for a beta clustering networking service is discussed in more detail below with respect to FIG. 9. Generating and transmitting a response for a networking service performing rolling server cluster upgrades is discussed in more detail below with respect to FIG. 10.

After transmitting the response to client 110, client 110 receives the response with the IP address and sends a content request to the IP address at step 650. The request to the IP address may include a request for a content page associated with the IP address.

Figure 7:
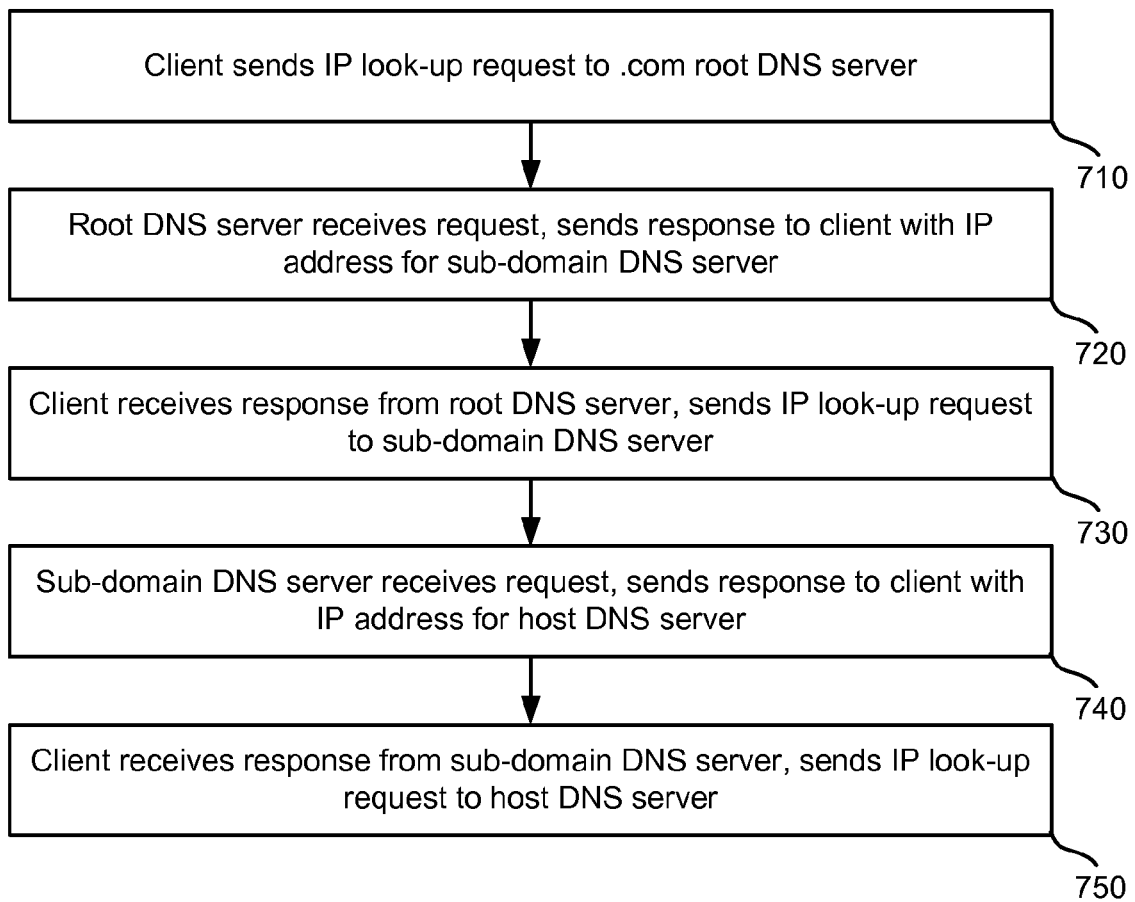
FIG. 7 is a flow chart of an embodiment of a method for sending an IP address lookup request.

FIG. 7 is a flow chart of an embodiment of a method for sending an IP address lookup request. In some embodiments, FIG. 7 provides more detail for step 620 of the method of FIG. 6. First, a client sends an IP lookup request to root DNS server 130 at step 710. Root DNS server 130 may be selected at random by client 110 as one of several availability root DNS servers which handle requests for domains ending in ".com." Next, root DNS server 130 receives a request from client 110, and sends a response to client 110 with an IP address for sub-domain DNS server 140 at step 720. The response with the IP address for sub-domain DNS server 140 can be a name server (NS) record with information regarding where to look for the requested information in the IP lookup request.

Client 110 receives the response from root DNS server and sends an IP lookup request to sub-domain DNS server 140 at step 730. The request is sent to the sub-domain DNS server mentioned in the response received from root DNS server 130. Sub-domain DNS server 140 receives a request and sends a response with an RN record to client 110 with an IP address for host DNS server 150 at step 740. Client 110 receives the response from sub-domain DNS server 140 and sends an IP lookup request to host DNS server 150 at step 750.

Figure 8:
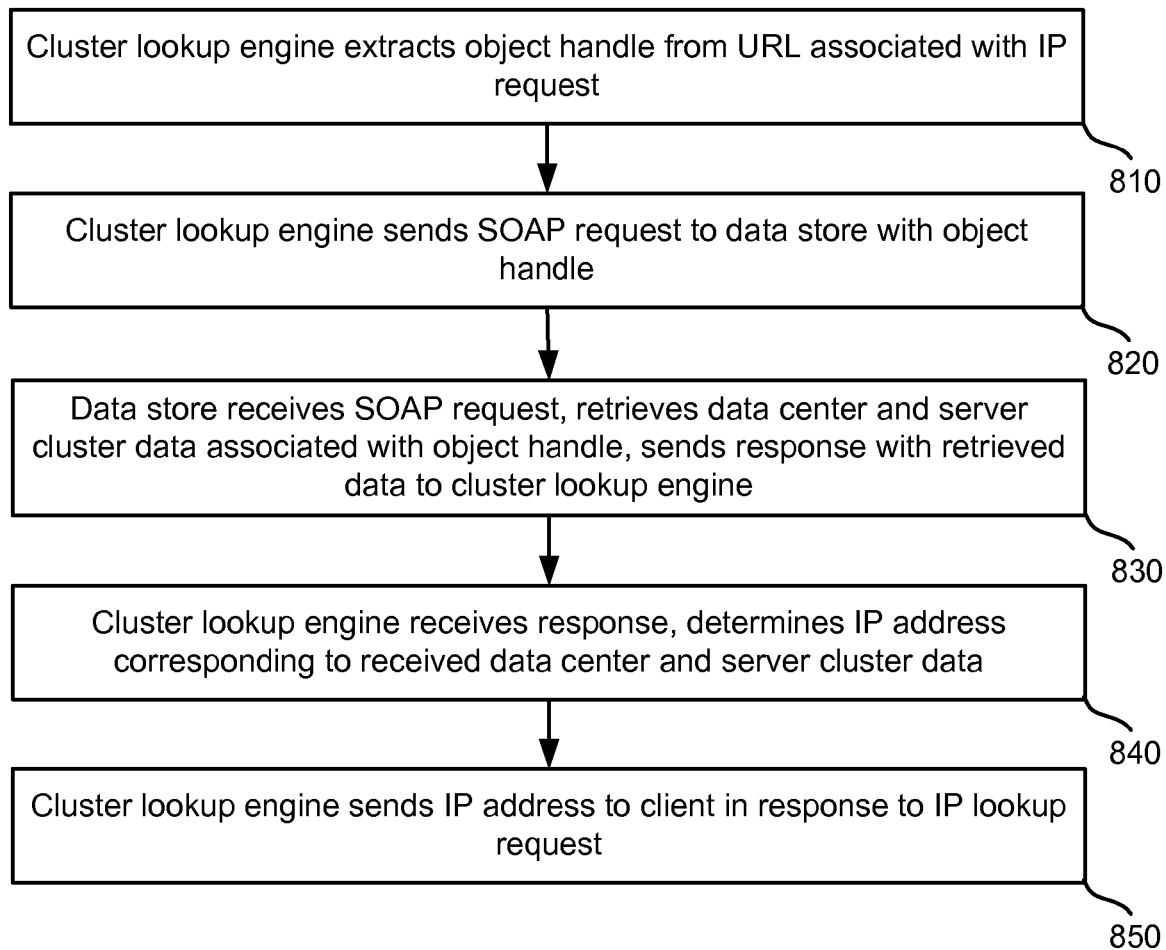
FIG. 8 is a flow chart of an embodiment of a method for determining an IP address in response to a request.

FIG. 8 includes a flow chart of an embodiment of a method for determining an IP address in response to a request. In some embodiments, FIG. 8 provides more detail for step 640 of the method of FIG. 6 for a generally scaled networking service. First, cluster lookup engine 152 extracts an object handle from a URL associated with an IP request at step 810. In one embodiment, the object handle is contained in the URL as the host domain. For example, in the URL billh.spaces.live.com, the extracted object handle associated with the host domain may be "billh." Next, cluster lookup engine 152 sends a server location request to data store 160 with the extracted object handle at step 820.

Data store 160 receives the request and processes the request at step 830. Processing the request may include retrieving data center and server cluster data associated with the object handle, placing the retrieved data in a response and sending the response with the retrieved data to cluster lookup engine 152. The data center and server cluster location data retrieved with respect to the object handle linked to the location data are retrieved from object handle table 162. An example of an object handle table 162 is illustrated in FIG. 2C. In some embodiments, the retrieved location data may only include a data center identifier associated with the object handle. The data center identifier may be a string, integer, or some other value.

Cluster lookup engine 152 receives the response and determines an IP address corresponding to the received data center and server cluster data at step 840. To determine the IP address, cluster lookup engine 152 determines the IP address associated with the particular data center and server cluster information within IP lookup table 158. An example of an IP lookup table is illustrated in FIG. 2B. In some embodiments, cluster lookup engine 152 receives a data center identifier from data store 160 and selects one of one or more available network servers within any server cluster within the data center. After determining the IP address, cluster lookup engine 152 sends the IP address to client 110 at step 850 in response to the IP lookup request received from the client at step 630.

Figure 9:
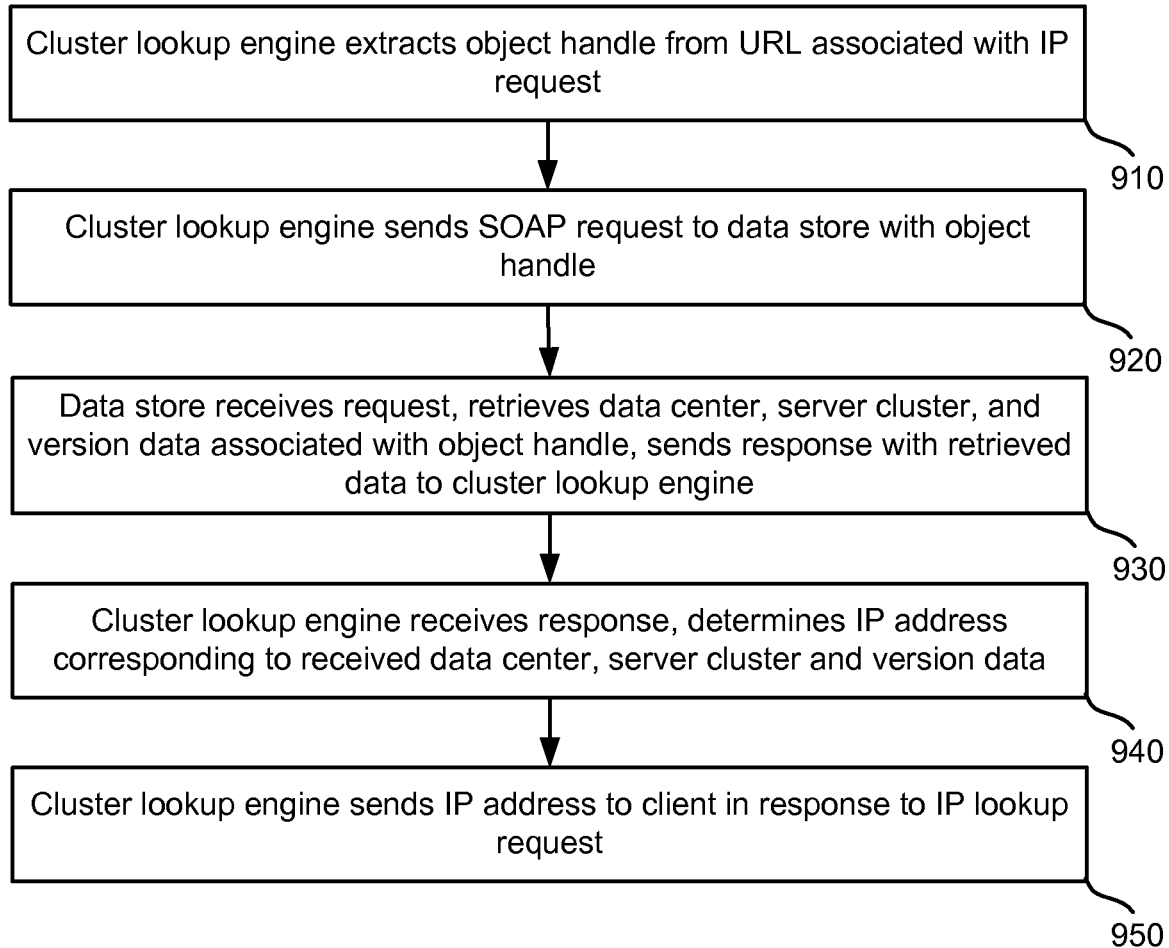
FIG. 9 is a flow chart of another embodiment of a method for determining an IP address in response to a request.

FIG. 9 is a flow chart of another embodiment of a method for determining an IP address in response to a request. In some embodiments, the method in FIG. 9 provides more detail for step 640 and is similar to the method of FIG. 8, except version data is retrieved from data store 160 to implement beta clustering. First, cluster lookup engine 152 extracts an object handle from a URL associated with the IP request at step 910. Cluster lookup engine 152 then sends a server location request to data store 160 with the extracted object handle at step 920.

Data store 160 receives the request and processes the request at step 930. Unlike the method of FIG. 8, processing the request at step 930 includes retrieving version data in addition to the data center and server cluster data associated with the object handle. Upon retrieving the corresponding version and other location data, data store 160 generates a response with the version and location data and transmits the response to cluster lookup engine 152 at step 930. As discussed above, version data may be used to indicate a beta service, main service or some other version of the service provided by a network-based networking service provided by data center 170 or 180.

Cluster lookup engine 152 receives the response, determines an IP address corresponding to the received data center and server cluster within IP lookup table 158 at 940. Thus, the version, data center and server cluster information are all used to select the IP address contained in table 158. For example, for the example values in the IP lookup table of FIG. 4B, an object handle associated with data center 001 and a version 005 would correspond to an IP address of 062.129.015.004. After determining the IP address, cluster lookup engine 152 sends the IP address to client 110 in response to the IP lookup request received from the client at step 950.

In some embodiments, cluster lookup engine 152 may ignore the version data based on a parameter set at DNS server 150. An administrator of a network service typically provides a beta version of the service to work out bugs, determine user opinion of the service, and for other reasons. After a trial period, the beta version is usually made the mandatory main version for the service. When a beta version of a networking service is made the main version of the service, version data is not considered because all users will be using the former beta version, which is now the mandatory main version. In one embodiment, a parameter may be set in cluster lookup engine 152 which indicates that version data should not be considered in determining an IP address for an object handle.

Figure 10:
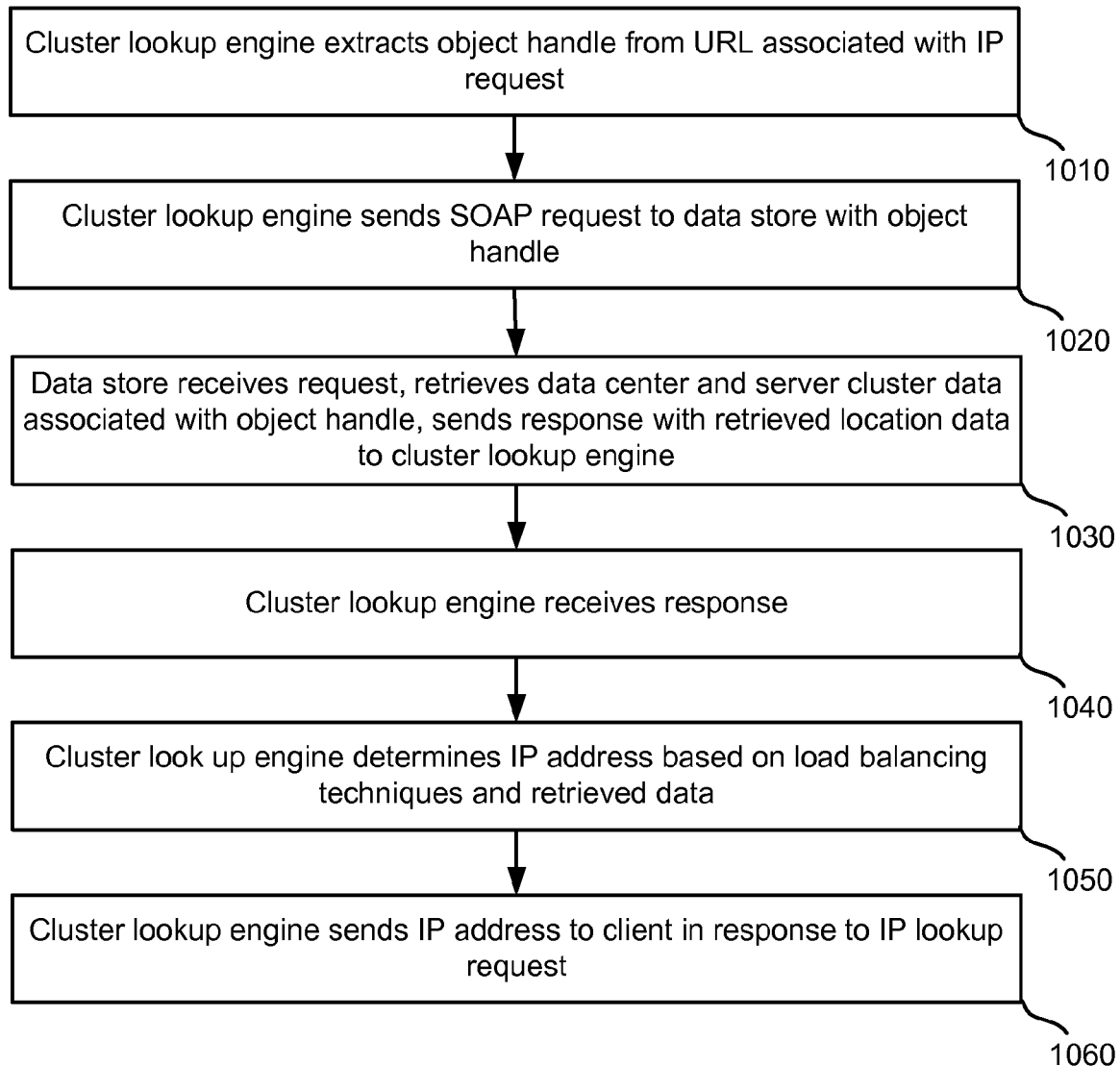
FIG. 10 is a flow chart of another embodiment of a method for determining an IP address in response to a request.

FIG. 10 is a flow chart of another embodiment of a method for determining an IP address in response to a request. In some embodiments, FIG. 10 provides more detail for step 640 and is similar to that of FIGS. 8 and 9, except the method is used while providing rolling upgrades to one or more server clusters within a data center. First, cluster lookup engine 152 extracts an object handle from a URL associated with an IP request at step 1010. Cluster lookup engine 152 then sends a location data request as a SOAP message to data store 160 with the extracted object handle at step 1020.

Data store 160 receives the location data request and processes the request at step 1030. Processing the request may include retrieving data center and server cluster location data associated with the object handle and sending the location data in a response to cluster lookup engine 152.

Cluster lookup engine 152 receives the response including the data center and server cluster location data at step 1040. Next, cluster lookup engine 152 determines the IP address based on load balancing techniques and the retrieved data at step 1050. Determining the IP address may include identifying the data center as one that should be load balanced, determining if the object handle is directly linked to a particular network server, and determining an IP address. After determining the IP address, cluster lookup engine 152 sends the IP address to client 110 in a response to the IP lookup request at step 1060.

Figure 11:
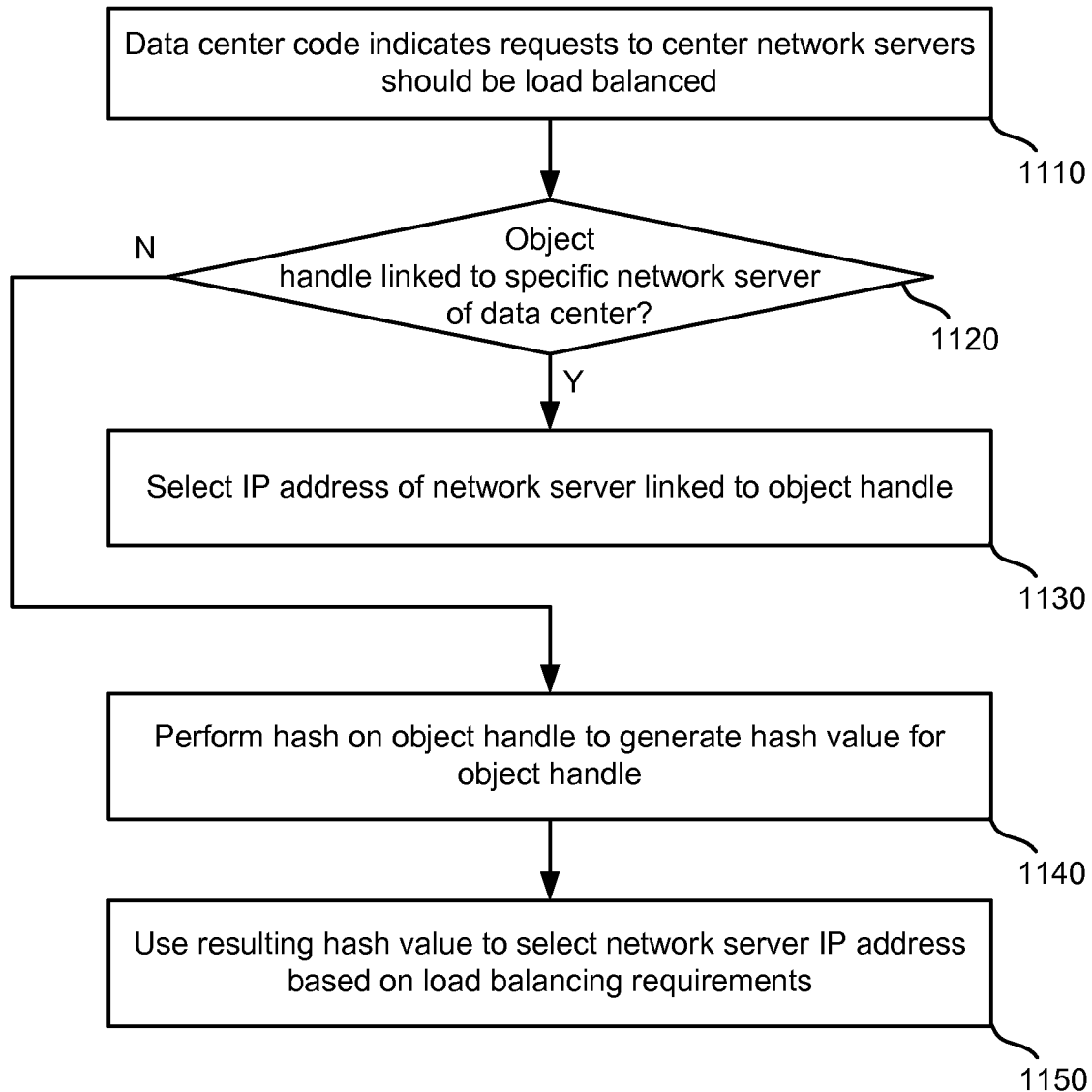
FIG. 11 is a flow chart of an embodiment of a method for determining an IP address for an object handle based on load balancing.

FIG. 11 is a flow chart of an embodiment of a method for determining an IP address for an object handle based on load balancing. In some embodiments, FIG. 11 provides more detail for step 1050 of FIG. 10. First, a determination is made that the data center data indicates that requests to the data center network servers and/or network clusters should be load balanced at step 1110. In some embodiments, the data center data may be a numerical identifier as indicated in object handle table 162 of FIG. 2A, a string, or some other value. Next, a determination is made as to whether the object handle is linked to a specific network server of the data center at step 1120. The object handle can be linked to a specific network server if an IP look table within cluster lookup engine 152 indicates the link. In some embodiments, cluster lookup engine 152 may include a lookup table for a number of object handles and IP addresses for network servers that are linked to the object handle. The object handle may be compared to the table to determine if it is linked to a network server. If the object handle is linked to a specific network server, the IP address of the network server is selected at step 1130 and the method of FIG. 11 ends. If the object handle is not linked to a specific network server, the method of FIG. 11 continues to step 1140.

If the object handle is not linked to a specific network server, the traffic to the data center is load balanced. The traffic may be load balanced based on a percentage of traffic between two or more active servers, for example 50-50, 40-60, 30-30-40, or some other percentage distribution of traffic. To implement load balancing, a hash is performed on the object handle to generate a hash value at step 1140. The hash may be any of several widely used hash methods to determine a string of characters from the object handle. The resulting hash value may then be used to select a network server IP address based on the load balancing requirements at step 1150. In some embodiments, the IP addresses selected from the range of hash values may correspond to the load balancing load percentages. For example, if three network servers are to share a traffic load by 30%, 30% and 40%, the first 30% of the range of hash values may be assigned to the first sever, the second 30% of the range of hash values may be assigned to the second sever, and the remaining possible hash values may be assigned to the third server. Other methods of assigning IP addresses to servers for load balancing purposes are possible as well, and intended to be included within the scope of the present technology.

In some embodiments, load balancing requirements may be delegated to a commercial load balancer by using CNAMEs. Thus, the DNS request for a content page such as "Steve.MyWebSite.Com" may returns BayDC.mysiteipaddress.COMPANY.net, where the "COMPANY" portion is the domain of the load balancer service. The load balance service then returns an appropriate IP address from the list of IP Addresses, based on its own policies, which may include load balancing and other considerations. This allows the DNS system to seamlessly plug into established practices for maintaining IP address, without introducing a separate IP table in the custom DNS system.

Figure 12:
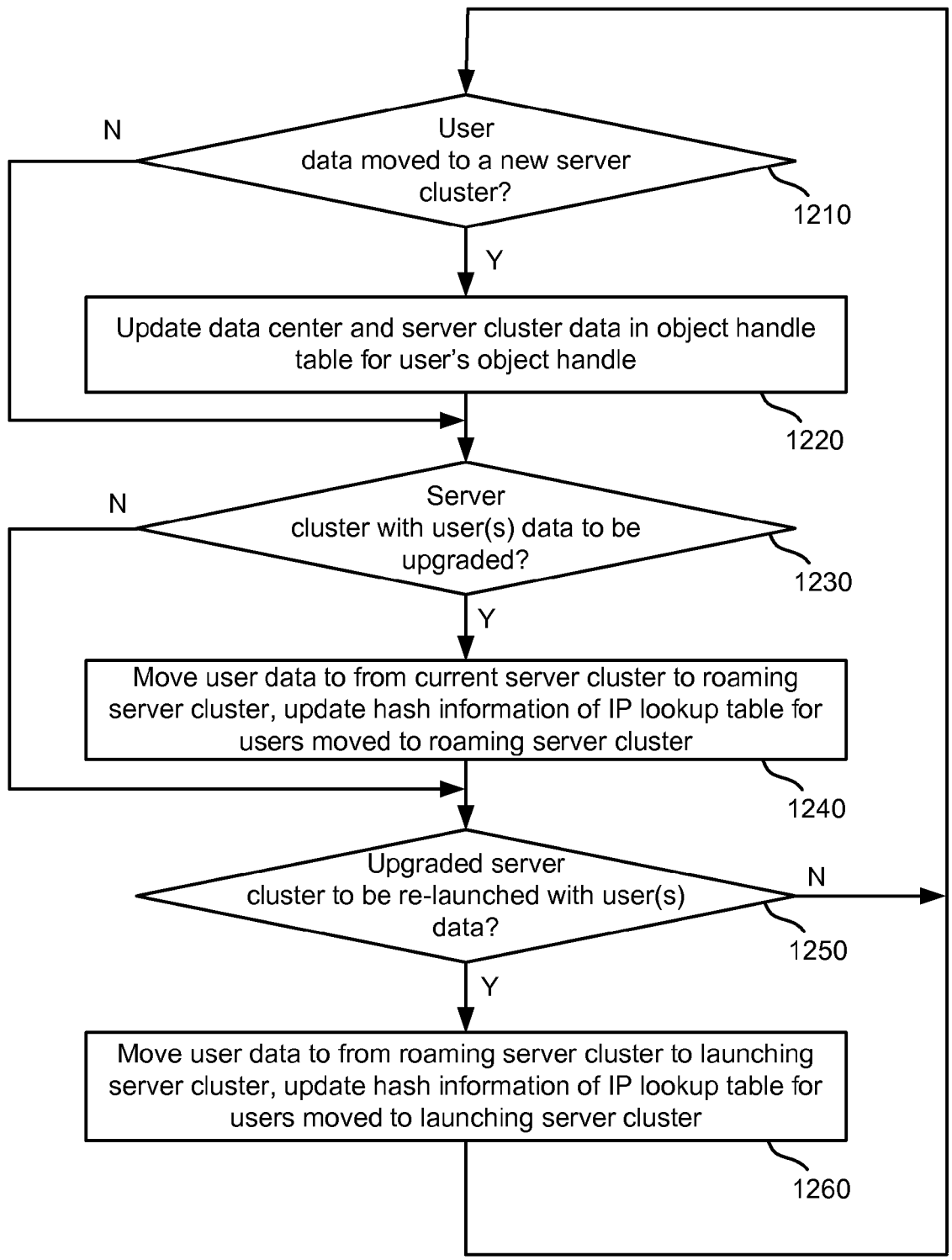
FIG. 12 is a flow chart of an embodiment of a method for maintaining data location data in an object handle table.

FIG. 12 is a flow chart of an embodiment of a method for maintaining location data in an object handle table. Thus, as user data is moved from one server cluster to another, the data center and server cluster location data in object handle table 162 must be updated as well. First, a determination is made as to whether user data is moved to a new server cluster at step 1210. For example, a user data may be moved from server cluster 172 to server cluster 174 within data center. If user data is moved to a new server cluster, the data center and server cluster data in the object handle table is updated for that user's object handle at step 1220. The data is updated to reflect the current location of the user data. The method of FIG. 12 then continues to step 1230. If the user data has not been transferred to a new server cluster at step 1210, the method of FIG. 12 continues to step 1230.

A determination is made as to whether a server cluster with user data is to be upgraded at step 1230. If no server clusters are to be upgraded, the method of FIG. 12 continues to step 1250. If one or more server clusters having user data are to be upgraded, user data is moved from the server cluster to roaming server cluster 540. Hash information may then generated and stored in IP lookup table for the users moved to roaming server cluster at step 1240. After moving the user data and updating the hash information for the IP lookup table within cluster lookup engine 528, the method of FIG. 12 continues to step 1250.

A determination is then made as to whether the upgraded server cluster is to be re-launched with user data at step 1250. Thus, the determination is based on whether the data contained in roaming server cluster 540 is to be transmitted back to the upgraded server cluster. If the upgraded server cluster is re-launched with user data, the user data is moved from roaming server cluster 540 to the launched server cluster and the hash information of the IP lookup table is updated for users moved to the launching server cluster at step 1260. In some embodiments, updating the hash information at step 1260 includes removing the hash information from the IP look table. The process of FIG. 12 then returns to step 1210. If no upgraded servers are to be re-launched with user data at step 1250, the method of FIG. 12 returns to step 1210.

Figure 13:
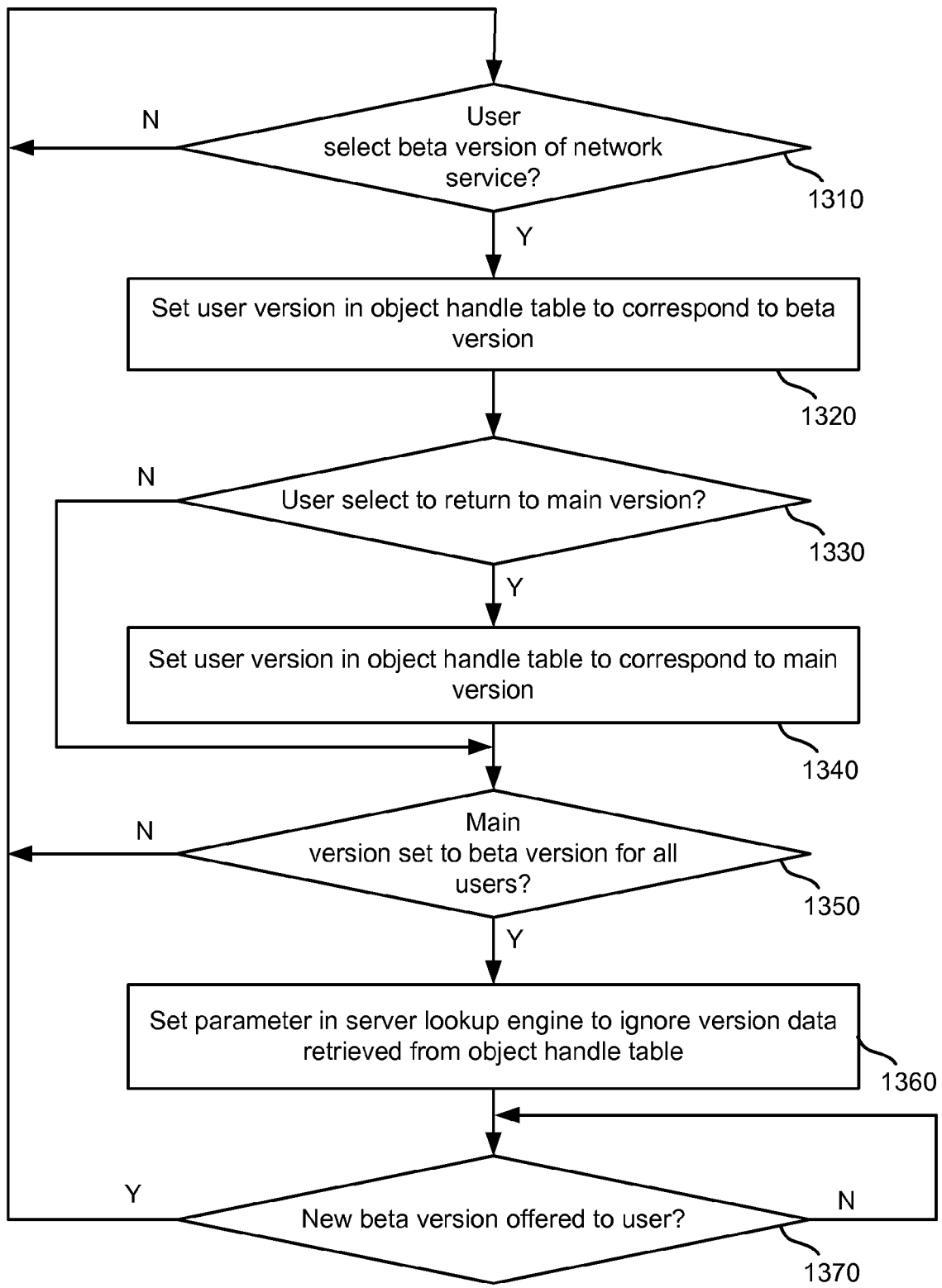
FIG. 13 is a flow chart of an embodiment of a method for maintaining version data in an object handle table.

FIG. 13 is a flow chart of an embodiment of a method for maintaining version data in an object handle table. The version data may be maintained to indicate what version of a service a user is using. First, a determination is made as to whether a user selects a beta version of a network service at step 1310. If a user has not selected to use a beta version of a networking service, the method of FIG. 13 remains at step 1310. If the user does select to use a beta version, version data for the user object handle is set in the object handle table to correspond to the beta version at step 1320. Typically, a beta version may be indicated as a numerical value which is greater than the main version by an increment of one. For example, a main version of a service may be identified as version 004 and a beta version as 005.

A determination is then made as to whether the user has selected to return to the main version of the network service at step 1330. If the user has not selected to return to the main version, the method of FIG. 13 continues to step 1350. If the user has selected to return to the main version of the network service, the user version data for the user object handle in the object handle table 162 is set to correspond to the main version at step 1340. A determination is then made at step 1350 as to whether the main version is set to the beta version for all users at step 1350. If the main version is not set to a beta version for all users, the method of FIG. 1350 returns to step 1310. If the main version is set to the beta version for all users, a parameter is set in server lookup engine 152 to ignore version data retrieved from object handle table 1360. Once this parameter is set, server lookup engine 152 will not incorporate version data in determining an IP address for location data (data center and server cluster) for a particular object handle. After setting a parameter in the object handle table, a determination is made as to whether a new beta version is offered to a user at step 1370. If a new beta version is not offered to a user, the method of FIG. 13 remains at step 1370. If a new beta version is offered to a user, the method of FIG. 13 returns to step 1310.

Although one of the applications discussed with respect to FIG. 13 for versioning is for a beta version, embodiments of the present technology are able to support one or more versions. Thus, there can be main, beta, and other versions in the system that we are supported with by embodiments of the present technology. Several variations of the present technology may be implemented in different embodiments. For example, in additional to the location of a domain for a content page, other useful information can be retrieved related to the user, such as the collection of network objects involved in serving the user data from the database to the web site layer. This information can be used to further optimize the transaction within a datacenter to a specific set of servers, establishing QOS-style transactions. In some embodiments, the present technology is not specific to technologies such as Windows DNS systems, HTTP, TCP/IP or IPv4. Additionally, a DNS server does not have to process a request which is in URL form; a general DNS-based routing system may apply the DNS name in naming URLs for users.

Figure 14:
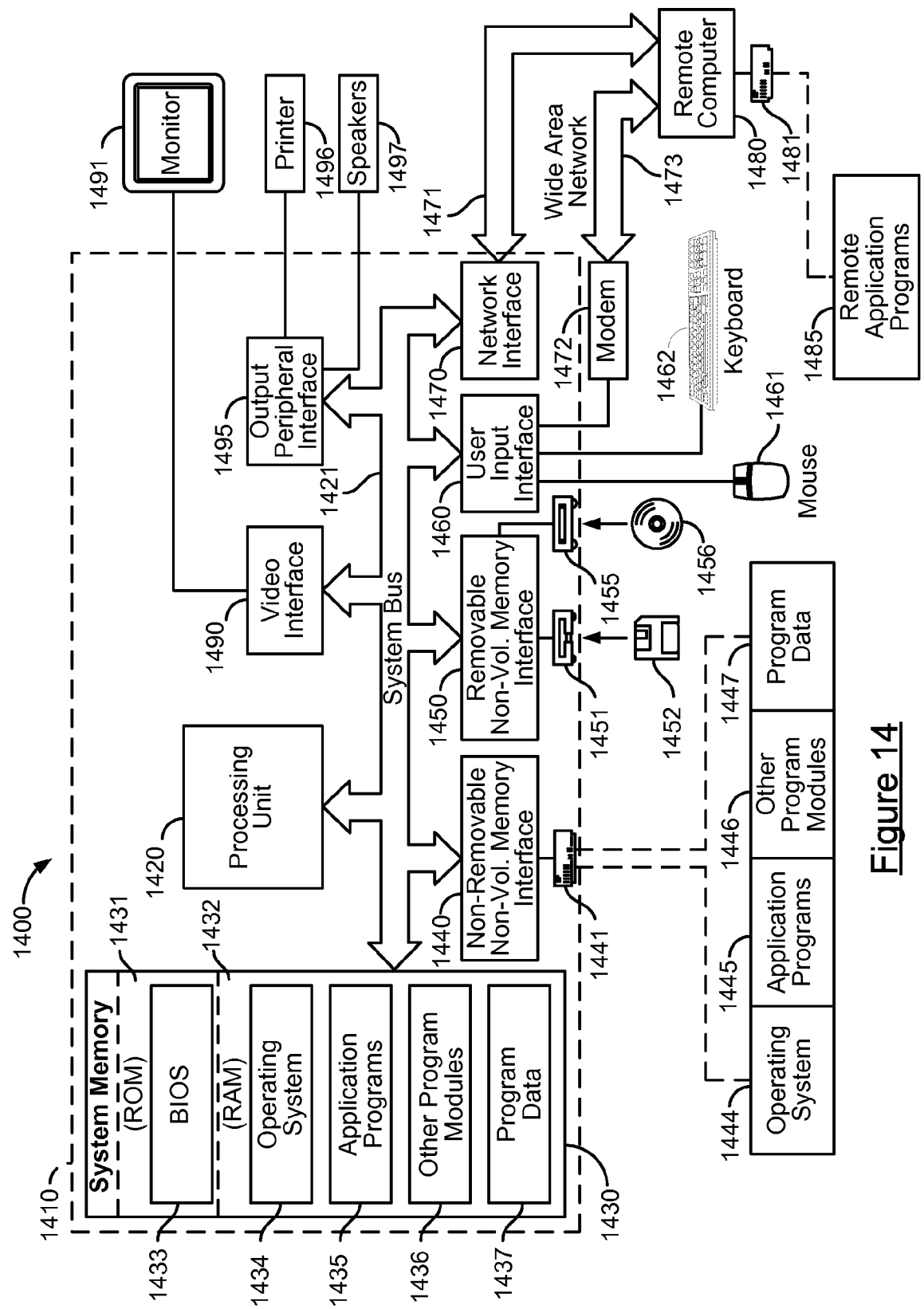
FIG. 14 is an embodiment of a computing environment for implementing the present technology.

FIG. 14 is an embodiment of a computing environment for implementing the present technology. In some embodiments, the computing environment of FIG. 14 provides more detail for client 110, servers 130-150, data store 160, the servers of server clusters 172-174, and other machines within network service data centers 170 and 180.

Computing environment 1400 of FIG. 14 is only one example of a suitable computing environment and is not intended to suggest any limitation as to the scope of use or functionality of the technology herein. Neither should the computing environment 1400 be interpreted as having any dependency or requirement relating to any one or combination of components illustrated in the exemplary operating environment 1400.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 14, an exemplary system for implementing the technology herein includes a general purpose computing device in the form of a computer 1410. Components of computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1410 typically includes a variety of computer readable media. Computer readable media can be any available media that can be accessed by computer 1410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable, volatile/nonvolatile computer storage media. By way of example only, FIG. 14 illustrates a hard disk drive 1440 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface, such as interface 1450.

The drives and their associated computer storage media discussed above and illustrated in FIG. 14, provide storage of computer readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. A user may enter commands and information into the computer 140 through input devices such as a keyboard 1462 and pointing device 1461, commonly referred to as a mouse, trackball or touch pad. Other input devices (not shown) may include a microphone, joystick, game pad, satellite dish, scanner, or the like. These and other input devices are often connected to the processing unit 1420 through a user input interface 1460 that is coupled to the system bus, but may be connected by other interface and bus structures, such as a parallel port, game port or a universal serial bus (USB). A monitor 1491 or other type of display device is also connected to the system bus 1421 via an interface, such as a video interface 1490. In addition to the monitor, computers may also include other peripheral output devices such as speakers 1497 and printer 1496, which may be connected through an output peripheral interface 1490.

The computer 1410 may operate in a networked environment using logical connections to one or more remote computers, such as a remote computer 1480. The remote computer 1480 may be a personal computer, a server, a router, a network PC, a peer device or other common network node, and typically includes many or all of the elements described above relative to the computer 1410, although only a memory storage device 1481 has been illustrated in FIG. 14. The logical connections depicted in FIG. 14 include a local area network (LAN) 1471 and a wide area network (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example, and not limitation, FIG. 14 illustrates remote application programs 1485 as residing on memory device 1481. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. One or more processor readable storage devices having processor readable code embodied on said processor readable storage devices, said processor readable code for programming one or more processors to perform a method comprising:

maintaining a table that links an object handle in a URL to location and version data, the location data identifying a cluster of one or more servers that stores a valid content page for a user having an account with the service provided over a network, the version data identifying a version of the service, the object handle is specific to the user having the account;

receiving a selection of a beta version of the service for the user;

moving content for the user to a beta version server such that the beta version server stores the valid content page;

updating the table to link the object handle to the beta version server;

receiving a DNS lookup request having a domain name from a remote computer;

determining an object handle from the domain name, the object handle specific to the user having an account with the service;

retrieving location and version data linked to the object handle in the table, the version data identifying the beta version of the service;

determining that the valid content page for the user is stored on the beta version server based on the retrieved location and version data;

determining an IP address associated with the beta version server; and sending the IP address to the remote computer in response to the DNS lookup request.

2. The one or more processor readable storage devices of claim 1, wherein said step of determining an object handle includes:

retrieving a portion of the domain name associated with an identifier for a user of the service provided over a network, the object handle comprising the user identifier.

3. The one or more processor readable storage devices of claim 2, wherein the step of determining an object handle is performed by plug-in code installed on a DNS server.

4. The one or more processor readable storage devices of claim 1, wherein said step of retrieving location and version data includes:
  constructing a location data request, the location data request including the object handle;
  transmitting the location data request to a data store containing location data linked to one or more object handles; and
  receiving a response from the data store, the response including the location and version data linked to the object handle.

5. The one or more processor readable storage devices of claim 1, wherein said step of determining an IP address includes:
  retrieving an IP address associated with the retrieved location and version data from an IP address lookup table within a DNS server.

6. The one or more processor readable storage devices of claim 1, wherein said step of determining an IP address includes:
  determining whether a parameter has been set to indicate that version data should be ignored; and
  retrieving an IP address associated with the retrieved location and version data based on the parameter setting.

7. A computer implemented method, comprising:
  maintaining user content for a plurality of groups of users on a corresponding plurality of server clusters in a data center, a server cluster includes one or more servers, valid content for each group of users is provided from a server cluster of the plurality of server clusters, the user content pertains to users having an account with a service that is provided over a network;
  maintaining a table of object handles, each of the object handles is specific to one of the users having an account with the service, the table links an object handle for each of the users to the server cluster that provides the valid content for the user with that object handle and a version of the service currently being used to provide the content for the user;
  receiving a first DNS lookup request having a domain name in the form of a first URL from a first client;
  identifying an object handle as the host domain of the first URL, the object handle specific to a first user of the service;
  retrieving data center identification information linked to the object handle in the URL, the data center identification information identifying a first server cluster of the plurality of server clusters that provides the valid content for the first user;
  determining a first IP address associated with the first server cluster;
  sending the first IP address to the first client in response to the first DNS lookup request;
  moving the valid content for the first user to a second server cluster of the plurality of server clusters, along with valid content of all users in the same group as the first user;
  updating the data center identification information to link the object handle to the second server cluster, along with updating the object handles of all users in the same group as the first user to the second server cluster;
  receiving a second DNS lookup request having the domain name in the form of a second URL from a second client after the updating;
  identifying the object handle as the host domain of the second URL;
  retrieving the data center identification information that links the object handle to the second server cluster;
  determining a second IP address associated with the second server cluster; and
  sending the second IP address to the second client in response to the second DNS lookup request.

8. The computer implemented method of claim 7, further comprising:
  upgrading the first server cluster after moving the valid content for the first user to the second server cluster;
  moving the valid content for the first user from the second server cluster to the first server cluster after the upgrading; and
  updating the data center identification information to link the object handle to the first server cluster after moving the valid content for the first user from the second server cluster to the first server cluster.

9. The computer implemented method of claim 7, wherein each server cluster has a unique IP address.

* * * * *